(12) United States Patent
Gilbert (10) Patent No.: US 12,401,383 B2
(45) Date of Patent: Aug. 26, 2025

(54) COMMUNICATION GATEWAY INTENDED TO CONNECT AN LPWAN NETWORK AND A CELLULAR NETWORK

(71) Applicant: KERLINK, Thorigne-Fouillard (FR)

(72) Inventor: Michel Gilbert, Thorigne-Fouillard (FR)

(73) Assignee: KERLINK, Thorigne-Fouillard (FR)

( * ) Notice: Subject to any disclaimer, the term of this patent is extended or adjusted under 35 U.S.C. 154(b) by 475 days.

(21) Appl. No.: 17/926,202

(22) PCT Filed: May 18, 2021

(86) PCT No.: PCT/EP2021/063161
§ 371 (c)(1),
(2) Date: Nov. 18, 2022

(87) PCT Pub. No.: WO2021/233922
PCT Pub. Date: Nov. 25, 2021

(65) Prior Publication Data
US 2023/0179243 A1   Jun. 8, 2023

(30) Foreign Application Priority Data

May 20, 2020   (FR) ..................................... 2005152

(51) Int. Cl.
*H04W 84/18*   (2009.01)
*H04B 1/10*   (2006.01)

(52) U.S. Cl.
CPC ... *H04B 1/1036* (2013.01); *H04B 2001/1045* (2013.01); *H04B 2001/1063* (2013.01)

(58) Field of Classification Search
CPC .......... H04B 1/1036; H04B 2001/1045; H04B 2001/1063; H04B 1/40; H04W 84/18; Y02D 30/70
See application file for complete search history.

(56) References Cited

U.S. PATENT DOCUMENTS 6,101,228 A * 8/2000 Hebron ............. H04L 25/03038
370/335
7,653,035 B2   1/2010 Lin et al.
(Continued)

FOREIGN PATENT DOCUMENTS

CN   109412631 A   3/2019

OTHER PUBLICATIONS

A. Christina Josephine Malathi and D. Thiripurasundari; "Review on Isolation Techniques in MIMO Antenna Systems"; Indian Journal of Science and Technology—Sep. 2016; 9(35):1-10.
(Continued)

*Primary Examiner* — Julio R Perez
(74) *Attorney, Agent, or Firm* — Notaro, Michalos & Zaccaria P.C.

(57) ABSTRACT

A communication gateway for connecting an LPWAN network to a network for access to a cellular or RAN network, the LPWAN network and the RAN network using radio links. Such a gateway typically allows connected objects and servers on the Internet to communicate according to the Internet of Things (IoT) architecture. However, the proximity of the frequency bands used for the two radio links may lead to mutual interference between them, the transmitter of one interfering with the receiver of the other, especially when the gateway is miniature, of the order of magnitude of the connected objects (approximately 10 cm). The disclosed gateway electromagnetically isolates the two RF channels by means of double filtering: by a bandpass filter on the LPWAN RF channel combined with a rejection filter on the cellular RF channel.

16 Claims, 4 Drawing Sheets

(56) References Cited

U.S. PATENT DOCUMENTS

| | | | |
|---|---|---|---|
| 8,284,721 B2 | 10/2012 | Chen et al. | |
| 9,647,787 B1* | 5/2017 | Schwartzman | H04B 17/345 |
| 11,228,328 B1* | 1/2022 | Veyseh | H04B 1/0475 |
| 12,255,374 B2* | 3/2025 | Liu | H01P 5/184 |
| 2005/0141895 A1 | 6/2005 | Ruiz | |
| 2005/0170776 A1 | 8/2005 | Siorpaes | |
| 2007/0238483 A1* | 10/2007 | Boireau | H04B 1/0057 |
| | | | 455/553.1 |
| 2009/0075603 A1* | 3/2009 | Li Puma | H04B 1/034 |
| | | | 455/76 |
| 2009/0176454 A1 | 7/2009 | Chen et al. | |
| 2015/0049651 A1 | 2/2015 | Hariharan et al. | |
| 2017/0230074 A1* | 8/2017 | Rose | H03F 3/24 |
| 2019/0089390 A1* | 3/2019 | Ta | H04B 1/582 |
| 2023/0179243 A1* | 6/2023 | Gilbert | H04B 1/40 |
| | | | 455/552.1 |

OTHER PUBLICATIONS

Written Opinion of the International Searching Authority for PCT/EP2021/063161 and machine translation thereof provided by WIPO Patentscope—Written Opinion mailed Jul. 29, 2021.
International Search Report and Translation of ISR—mailed Jul. 29, 2021.
International Application Status Report for PCT/EP2021/063161.

\* cited by examiner

COMMUNICATION GATEWAY INTENDED TO CONNECT AN LPWAN NETWORK AND A CELLULAR NETWORK

TECHNICAL FIELD

The invention relates to the field of radio communications or radiocommunications; it relates more precisely to a gateway connecting a network conforming to a Low Power Wide Area Network (LPWAN) protocol to a network for accessing a cellular network (Radio Access Network, RAN); and still more precisely to such a gateway equipped with filters within the radiofrequency processing chains (RF chains), which allows it to be miniaturized.

TECHNOLOGICAL BACKGROUND

In the context of the development of the Internet of Things, connected objects communicate by radio with the Internet. The Internet is supported by large infrastructure networks to which the connected objects must have access through a gateway. The connected objects are organized in a star formation around the gateway and connected to the latter by radio. The signals coming from the connected objects arrive at the gateway on a first interface and pass through it to reach an infrastructure network via a second interface.

In the present application, it is envisioned that this infrastructure is a cellular network, for example conforming to the GSM standard or to a standard which derives from it: essentially 3G, 4G or 5G. The function of the gateway is therefore as a terminal of a cellular network and it accesses the core of the network via a radio channel.

The connected objects must benefit from a long autonomy for the processing of signals and they must be able to be disseminated over a wide area. The acronym LPWAN which summarizes these two essential demands (low-power wide area network, the low power allowing the long autonomy) is commonly used by those skilled in the art. Thus, the protocols which support the communication of the connected objects with the Internet must be of the LPWAN type. The LPWAN network considered in the present application conforms for example to the standard EN 300 220 published by the ETSI. One example of LPWAN protocol conforming to this standard and whose specifications have been made public is LoRaWAN®. Strictly speaking, the term LPWAN is also applicable to the network for accessing the cellular networks (NB-IoT, LTE-M) but in the present application, it will be reserved for the non-cellular network to which the gateway is connected.

US 2017230074 discloses such an architecture and a miniature gateway which connects a LPWAN interface with a cellular interface. However, the problem of the isolation between the two RF chains is not posed.

SUMMARY

The aim of the invention is to electromagnetically isolate the two RF chains of a gateway connecting an LPWAN network and a network for accessing a cellular network, and hence possessing two RF chains respectively toward two such networks, to a level sufficient to avoid the degradation of the signal-to-noise ratio on the receivers of the RF chains when the gateway is miniature. More precisely, the level of isolation sought by the invention on the LPWAN RF chain is at least 20 dB and that sought on the cellular RF chain is at least 20 dB. The frequency, bands of the two RF chains of the gateway are neighboring or even contiguous. For example, in certain European countries, according to the radiofrequency regulations, the band 915-918 MHz may be used on the LPWAN network and the band 880-915 MHz for the uplink of the cellular network (band 8 of the LTE). Since neither of the receivers are perfect bandpass filters, they absorb the undesirable radiation in the frequencies neighboring the useful band hence those emitted by the other RF chain.

One idea on which the invention is based is to miniaturize the gateway while at the same time ensuring that it will operate without interference between the RF chains. In the application envisioned, the Internet of Things, the gateway has to be small, around 10 cm. The mutual interference between the RF chains cannot be avoided by the simple solution consisting in moving the antennas away from each other. This is because it is considered that, in order to obtain a good electromagnetic isolation, two antennas must be separated by at least a quarter of the wavelength that they emit; for example, 8.6 cm for a wave of 868 MHz. More generally, as the wavelength is inversely proportional to the frequency, the separation of the antennas must be relatively large for the low frequencies, which is not compatible with the dimensions of the gateway and the desired frequencies. Another idea on which the invention is based is to isolate the RF chains essentially by means of a double filtering: a bandpass filter is introduced into the RF chain of the LPWAN, in the part common to the reception and to the transmission, and a rejection filter in the RF chain of the cellular network. The function of each of these filters is to attenuate the power of the emitted frequencies which interfere with the other RF chain and also to immunize at reception each RF chain against the emissions of the other chain.

Another idea on which the invention is based is that there may be one or more LPWAN networks to which the gateway gives access and one or more cellular networks to which the gateway gives access.

According to a first subject, the invention is a communications Gateway intended to connect at least one LPWAN network and at least one cellular network, the gateway comprising:
  a first RF chain intended to communicate with said at least one LPWAN network, the first RF chain comprising an LPWAN antenna, a transponder with a transmitter and a receiver and, installed in series between the transponder and the LPWAN antenna:
    at least one filtering block, comprising:
      an amplification block comprising an uplink channel and a downlink channel configured in parallel,
      then, going toward the LPWAN antenna, a part common to the uplink channel and to the downlink channel, the common part comprising a bandpass filter passing the frequencies in a frequency band of said at least one LPWAN network and attenuating the power of the frequencies outside of the band of said LPWAN network,
    and a first high-pass filter; and
  a second RF chain toward the cellular network, the second RF chain being suitable for establishing an uplink and downlink connection with the cellular network, a frequency band of the uplink and a frequency band of the downlink being outside of the frequency band of said LPWAN network, the second RF chain comprising an antenna, a modem and, installed in series between the modem and the antenna:

at least one rejection filter attenuating the power of the frequencies within the frequency band of said at least one LPWAN network and passing the frequencies within the frequency band of the downlink and the frequency band of the uplink of the cellular network.

According to embodiments, the gateway may comprise one or more of the features hereinbelow.

According to one embodiment, in the second RF chain, the gateway comprises a single rejection filter and a second high-pass filter between the rejection filter and the antenna.

With this high-pass filter, the gateway conforms to the prior art for a cellular RF chain.

According to one embodiment, in the second RF chain, the gateway comprises a single rejection filter connected directly to the antenna.

Thus, this embodiment saves one high-pass filter.

According to one embodiment, the gateway is able to connect, on the one hand, a sub-group of LPWAN networks selected from amongst a group of LPWAN networks operating in respective frequency bands and, on the other hand, a cellular network.

The transponder of the first RF chain comprises a respective transmitter-receiver pair for each of the members of the group of LPWAN networks. The first PE chain comprises several filtering blocks, each of them being associated with a respective member of the group of LPWAN networks and comprising an amplification block, a bandpass filter passing the frequencies in the respective frequency band of said member of the Group of LPWAN networks and attenuating the power of the frequencies outside of this band. The first RF chain furthermore comprises a LPWAN network multiplexer, arranged between the filtering blocks and the first high-pass filter.

In the second RF chain, there are several rejection filters configured in parallel and respectively associated with each of the members of the group of LPWAN networks, the rejection filter associated with a respective member of the group of LPWAN networks attenuating the power of the frequencies within the frequency band of said respective member of the group of LPWAN networks. The second RF chain furthermore comprises a first and a second rejection filter multiplexer for selectively connecting the rejection filters associated with a sub-group of selected LPWAN networks, which first and second rejection filter multiplexers supervise the rejection filters, the second rejection filter multiplexer being on the side of the cellular antenna. Thus, the gateway is able to create, within its environment, an LPWAN network potentially operating over several frequency bands.

According to one embodiment, in the variant able to connect a sub-group of LPWAN networks selected from amongst a group and a cellular network, the gateway comprises a control block 16 with a human-machine interface which allows the sub-group of LPWAN networks to be selected and a control unit configured for programming the multiplexer of the first RF chain so that it connects the filtering blocks associated with the respective members of the sub-group of selected LPWAN networks, and for programming the first and second multiplexers of the second RF chain so that they connect the rejection filters associated with the respective members of the sub-group of selected LPWAN networks. According to one embodiment, in its variant able to connect a sub-group of LPWAN networks selected from amongst a group to a cellular network, in the second RF chain, the gateway comprises a second high-pass filter between the second rejection filter multiplexer and the cellular antenna.

According to one embodiment, in its variant able to connect a LPWAN network selected from amongst a group to a cellular network, the gateway comprises several rejection filters in the second RF chain and the second rejection filter multiplexer is connected directly to the antenna.

According to one embodiment of the gateway, said or each filtering block of the first RF chain furthermore comprises a channel selector arranged between the amplification block and the bandpass filter and configured so as to obtain a half-duplex operation in the frequency band of the LPWAN network or of the respective member of the associated group of LPWAN networks.

According to one embodiment of the gateway, the bandpass filter of said or of each filtering block is configured for attenuating by at least 20 dB the power of the frequencies outside of the band of the LPWAN network or of the respective member of the associated group of LPWAN networks.

According to one embodiment of the gateway, said or each rejection filter of the second RF chain is configured for attenuating by at least 20 dB the power of the frequencies within the frequency band of the LPWAN network or of the respective member of the associated group of LPWAN networks.

According to one embodiment, the gateway comprises an electronic board on which the first RF chain and the second RF chain are installed and whose size does not exceed 12 cm in the three dimensions.

Thus, the gateway may be miniaturized while being sure that neither of the RF chains in transmission mode will interfere with the operation of the other RF chain in reception mode.

According to one embodiment, the gateway according to the variants or the embodiments hereinabove comprises RF chains adapted to a separation of at most 8 MHz between the frequency bands of the cellular networks and the frequency bands of said LPWAN networks.

Thus, the gateway is adapted to the regions of the world where the legislator has assigned frequency bands separated by 8 MHz, at the most, for the LPWAN networks and the cellular networks.

According to one embodiment, the uplink or downlink signals on the first RF chain conform to the standard EN 300 220.

According to one embodiment, the bandpass filter or filters are chosen from within the group of surface acoustic wave filters, bulk acoustic wave filters and ceramic filters.

According to one embodiment, the rejection filter or filters are chosen from within the group consisting of surface acoustic wave filters, bulk acoustic wave filters and ceramic filters.

According to one embodiment, the isolation of the first and second RF chains is completed by one or more techniques for isolation of antennas chosen from within the group of the decoupling of antennas, of the addition of antenna interference elements, of defected ground structures, of neutralizing lines, of dielectric enclosures, of metamaterials.

BRIEF DESCRIPTION OF THE FIGURES

The invention will be better understood, and other aims, details, features and advantages of the latter will become more clearly apparent during the following description of several particular embodiments of the invention, given solely by way of non-limiting illustration, with reference to the appended drawings.

DESCRIPTION OF THE EMBODIMENTS

Figure 1:
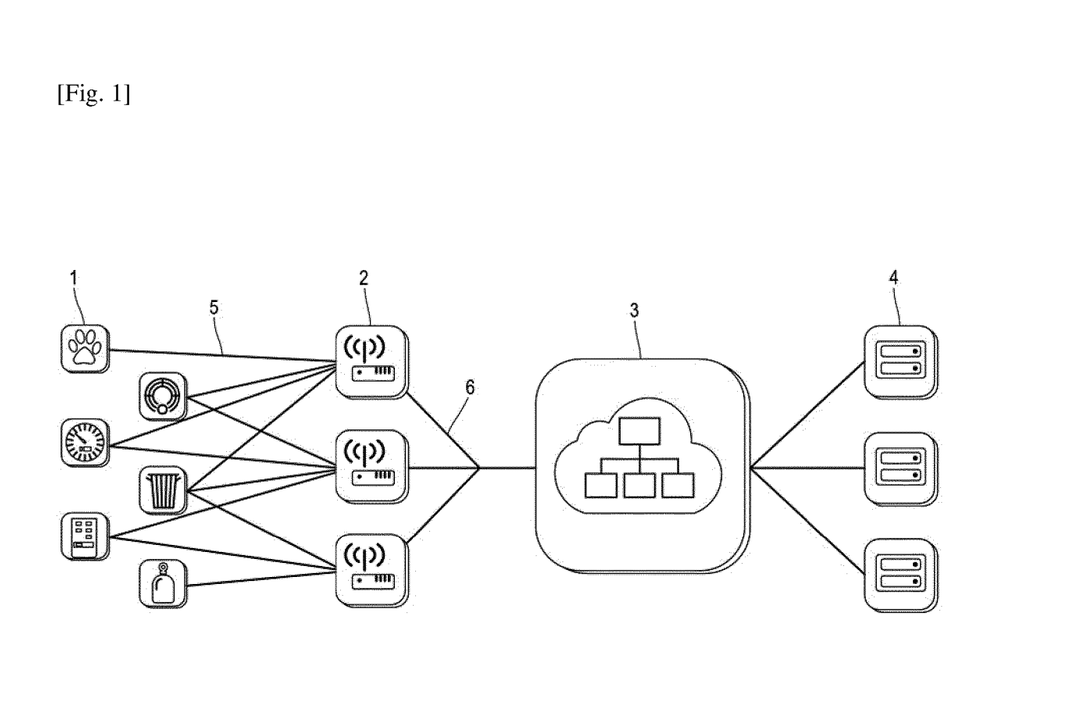
FIG. 1 shows an overall architecture of a LoRaWAN® network where a gateway according to the invention is able to be used.

In [FIG. 1], connected objects 1 communicate with application servers 4.

In one direction, the connected objects 1 transmit data. The connected objects 1 are, in general, sensors such as electronic chips for following companion animals, smoke detectors, water meters, refuse bin inspection chips, vending machine counters, gas meters. They take measurements which they digitize. They send them to application servers 4 which store them, apply various processing operations to them, and then redistribute them. In the other direction, the application servers 4 remotely control the connected objects 1. The typical data network to which the servers are connected is the Internet and the typical architecture which implements this communications configuration is "the Internet of Things".

In this architecture, the connected objects 1 firstly communicate via a radio link 5 with a gateway 2. The radio 1 link 5 between the connected objects 1 and the gateway 2 is of the LPWAN type and conforms to the standard EN 300 220; for example, and in a non-limiting manner, it conforms to the public specifications LoRaWAN® of the LoRa Alliance®, a consortium of industrial partners who promote these specifications.

The gateway 2 re-transmits the signals 5 coming from the connected objects 1 to an infrastructure network. In the present application, the infrastructure network is a cellular network, conforming to the GSM standard or to a standard which derives from it: 3G, 4G or 5G to mention the main standards. The gateway 2 is therefore a terminal for accessing a cellular network and communicates with the core of the cellular network by radio via an access network 6. The signals 6 reach the core of the cellular network via access servers 3. The access network at the core of the cellular network will be abbreviated to "cellular network" in the remainder of the application unless it is necessary to be more precise.

If it is the application servers 4 that control the connected objects 1 remotely, the communications follow the reverse path.

The frequencies used in the radio links of the LPWAN network or of the cellular network depend on the country where the gateway is operating. They are defined worldwide by the international treaty, subject of the Regulations of the ITU-R (International Telecommunications Union, Radiocommunications sector) which allocates, according to the technical term, in other words which assigns, the various frequencies to various Services in the three Regions of the world ("Regulations", "Service" and "Region" here are the technical terms of the ITU-R) and imposes radiation patterns on the transmitters in these frequencies; then, at the national level, these rules are detailed and the rights of exploitation of the frequencies are defined. The frequencies of the cellular networks at a given place are subject to concessions from the local State with a principle of exclusivity, whereas the LPWAN frequencies are free to use and may be shared by several operators who must then coordinate with one another in order to operate together.

"Band" is employed in the following part of the application as an abbreviation of "frequency band". The gateway 2 may be adapted to any coherent set of national regulations (coherent in the sense that bands of different allocations do not overlap. In one variant, it may only be adapted to a part of the bands intended for the LPWAN and for the cellular communications of the regulations of a single state. In another variant, it may be adapted to all the bands intended for the LPWAN and for the cellular communications of the regulations of a given state.

For example, the gateway 2 is adapted to one or more of the following regulations.

Europe (Region 1)
    Bands of the LPWAN: 868-870 MHz, 863-870 MHz, 863-876 MHz, 915-918 MHz or 915-921 MHz, depending on the country
    Bands of the Cellular Network
        band 8 of the LTE: uplink: 880-915 MHz; downlink: 925-960 MHz
        band 20 of the LTE: uplink: 832-862 MHz; downlink: 791-821 MHz North America (Region 2)
    bands of the LPWAN: 902-928 MHz
    bands of the cellular network (band 8 of the LTE): uplink: 824-849 MHz; downlink: 869-894 MHz South America (Region 2), Australia and New Zealand (Region 3)
    bands of the LPWAN: 915-928 MHz
    bands of the cellular network
        band 8 of the LTE: uplink: 890-915 MHz; downlink: 935-960 MHz
        band 5 of the LTE: uplink: 824-849 MHz; downlink: 869-894 MHz Asia, Thailand, Taiwan and Singapore (Region 3)
    bands of the LPWAN: 920-925 MHz
    band 8 of the LTE: uplink: 885-915 MHz; downlink: 930-960 MHz The LPWAN networks are symmetrical in the sense that, being given a frequency usable on such a network, a terminal such as one of the connected objects 1 or the gateway 2 may transmit or receive at this frequency. The cellular access networks are asymmetrical: from the terminal such as the gateway 2 to the core of the network to which the terminal is subscribed, the term 'uplink' and, in the other direction, 'downlink' are used and the frequencies of an uplink and of a downlink of the network are necessarily different.

Figure 2:
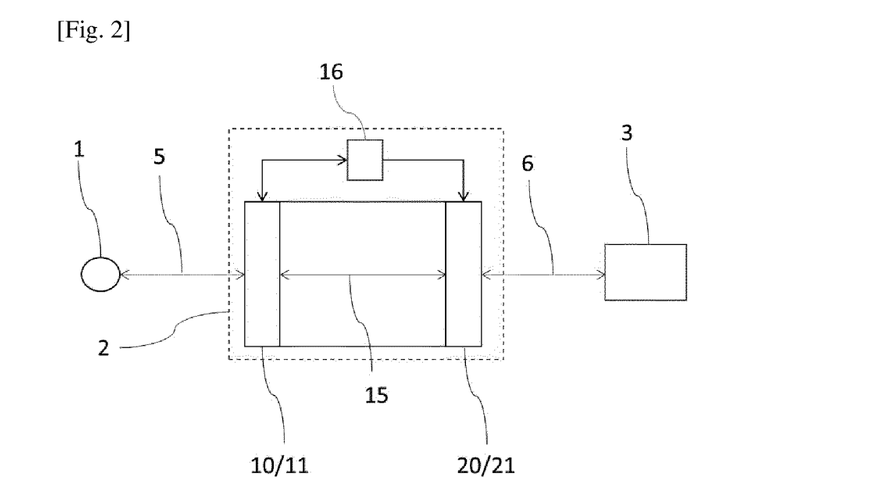
FIG. 2 shows the architecture of the gateway.

The architecture and the operation of the gateway are illustrated in [FIG. 2]. The gateway 2 receives signals by radio on its RF chain 10/11 adapted to LPWAN networks, demodulates them and transmits them along an internal electrical circuit 15 to the RF chain 20/21, adapted to cellular networks, which modulates them and transmits them by radio to the core of the cellular network. The communication may follow the reverse path.

The dimensions of the gateway 2 are preferably of the order of magnitude of the connected objects 1. Thus, the applicant has constructed a prototype of the gateway mounted on an electronic board of around 8 cm.

As a transmitter, each RF chain 10, 20 interferes respectively with the other RF chain 20, 10, as a receiver. It is therefore useful to electromagnetically isolate the RF chains 10, 20 from each other, especially as the gateway 2 is small.

Figure 4:
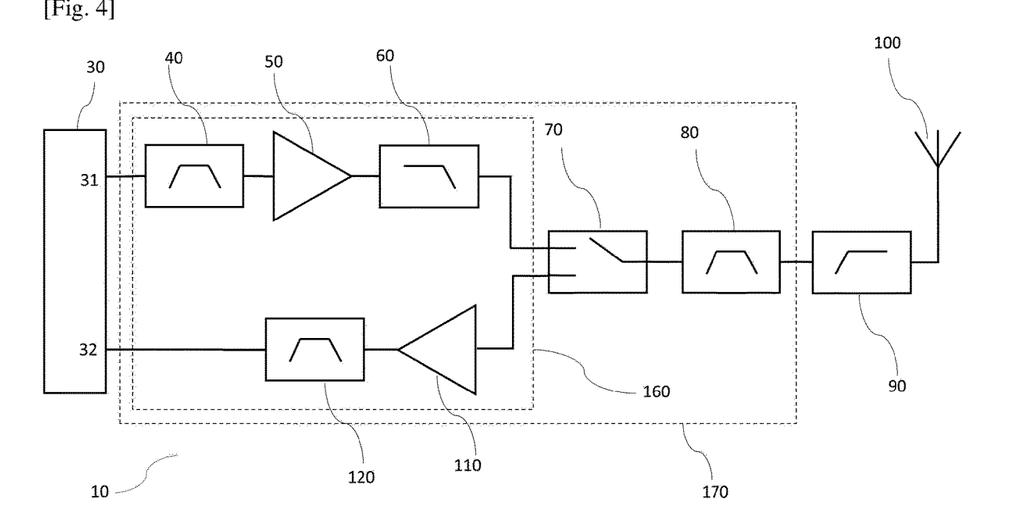
FIG. 4 shows the LPWAN RF chain according to a first embodiment of the invention.

[FIG. 4] shows the LPWAN RF chain 10 of the gateway 2 in a first embodiment of the invention. The RF chain 10 comprises a baseband unit, not shown, and a transponder 30. A transmission channel carrying the uplink signal starts from the point 31 of the transponder and a reception channel carrying the downlink signal arrives at the point 32 of the transponder. On the transmission channel, the uplink signal is firstly filtered by a bandpass filter 40, then amplified by a power amplifier 50, then filtered by a low-pass filter 60, by a bandpass filter 80 and finally by a high-pass filter 90 and it arrives at the antenna 100. Upon reception, the signal comes from the antenna 100, it is filtered by the high-pass filter 90, then the bandpass filter 80, which are therefore common to the uplink channel and to the downlink channel, and also to the antenna 100. The downlink signal is subsequently amplified by a low-noise amplifier 110 and finally filtered by a bandpass filter 120 before reaching the transponder 30.

In the state of the regulations in 2020, in Europe at least, the transmission and reception frequency bands in the LPWAN networks are common. The IOWAN antennas therefore operate alternately in transmission mode or in reception mode (half-duplex operation) and a selector 70 needs to be provided in the RF chain for connecting the uplink channel or the downlink channel and the part of the RF chain common to both channels.

The future changes in the regulations on the bands allocated to the LPWAN will probably allow the use of the LPWAN frequency bands simultaneously in reception and in transmission (full-duplex operation). The gateway 2 will then comprise a duplexes instead and in place of the selector 70 and of the bandpass filter 80.

The elements between the transponder 30 and the selector 70 form an amplification block 160. The amplification block 160, the selector 70 and the bandpass filter 80 form a filtering block. The notions of amplification block and of filtering block are introduced for the sake of clarity of the description.

The filter 80 allows the bands of the LPWAN to pass upon transmission and eliminates the bands outside. In reality, there is no true elimination but an attenuation. Thus, the filter 80 attenuates the power of the frequencies emitted by the LPWAN RF chain 10 which interfere with the reception in the cellular RF chain 20, in other words those that are in the bands of the downlink of the cellular network.

However, this filter has, in addition, the advantage of attenuating the frequencies emitted by the cellular RF chain 20 (the frequencies of the uplink of the cellular network) which interfere with the reception in the LPWAN RF chain 10.

Figure 5:
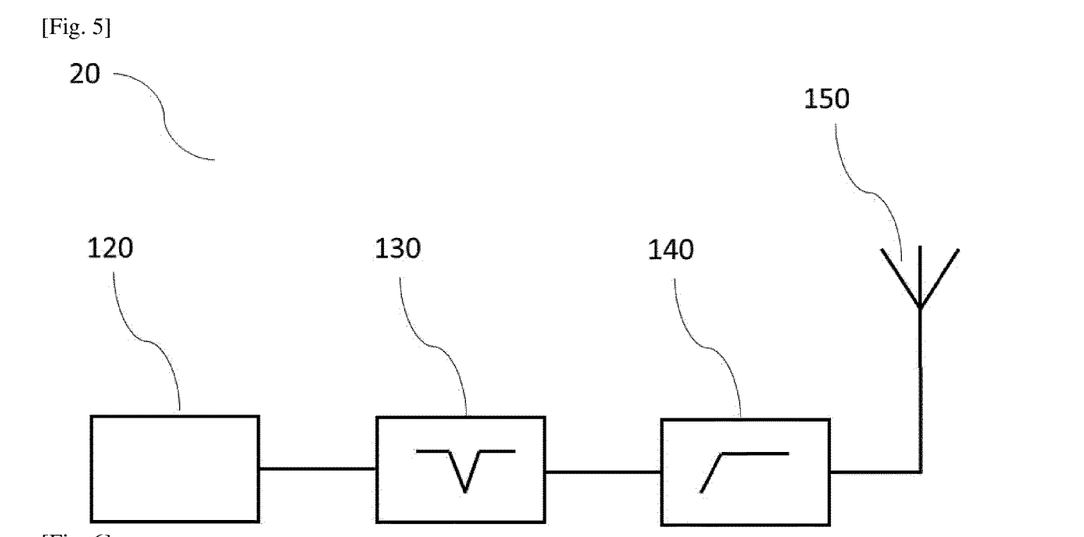
FIG. 5 shows the cellular RF chain according to a first embodiment of the invention.

[FIG. 5] shows the cellular RF chain 20 of the gateway 2 in the first embodiment of the invention. The RF chain comprises a modem 120 which includes the baseband unit and the transponder, a rejection filter 130, and an antenna 150. It is advantageous to insert a high-pass filter 140 between the rejection filter 130 and the antenna 150 because it thus still conforms to the prior art which allows the costs of industrialization to be reduced. There exists a single channel common to the uplink signal and to the downlink signal. The modem 120 is universal, adapted to all the cellular frequencies in the world.

The function of the filter 130 is to attenuate the power of the frequencies emitted by the cellular RF chain 20 (the frequencies in bands of the uplink of the cellular network) which interfere with the reception in the LPWAN RF chain 10. However, it also has the advantage of attenuating the frequencies of the LPWAN RF chain 10 which interfere with the reception in the RF cellular chain 20.

One example of the gateway 2 has been designed and implemented to operate in the band 868-870 MHz of the LPWAN and in the bands of 700 MHz to 2200 MHz of the LTE cellular networks. The gateway is intended to be used in the region of the world referred to as EMEA (for Europe, Middle East, Africa). The bandpass filter 80 inserted in the LPWAN RF chain 10 is a surface acoustic wave filter (SAW filter) of the model 83430 from the manufacturer RF360. This filter attenuates the power of the frequencies emitted in the band of the downlink of the LTE by at least 40 dB (division of the power by 10,000).

The rejection filter 130 inserted into the cellular RF chain 20 is a surface acoustic wave filter of the model WFB88C0869FH from the manufacturer NDK, which attenuates the power of the frequencies emitted in the band of the LPWAN 868-870 MHz by an amount of at least 20 dB (division of the power by 100) and typically by an amount of 33 dB (division of the power by 2000).

Another example of the gateway 2 has been designed and implemented to operate in the band 902-928 MHz of the LPWAN networks and in the bands 700 MHz to 2200 MHz of the LTE cellular networks. The gateway is intended to be used in North America (USA, Canada, Mexico). The bandpass filter 80 inserted into the LPWAN RF chain 10 is a surface acoustic wave filter of the model B2672 from the manufacturer RF360. This filter attenuates the power of the frequencies of the LTE by at least 20 dB (division of the power by 100) and typically by an amount of 30 dB (division of the power by 1000). The rejection filter 130 inserted into the RF cellular chain 20 is a surface acoustic wave filter of the model WFH24A0915FE from the manufacturer NDK, which attenuates the power of the frequencies in the band 902-928 MHz typically by an amount of 20 dB (division of the power by 100).

These commercial components are mentioned by way of illustration which does not exclude the use of other ones. Other types of filters could be used such as bulk acoustic wave filters (BAN filters) and ceramic filters. The isolation may be completed by antenna design techniques. The following may be mentioned: decoupling of antennas which allows a level of isolation of 10 to 15 dB at the desired frequencies; passive antenna elements (radiating elements not electrically powered), allowing 20 dB of isolation; defected ground structures (ground is taken in the sense of a neutral electrical point), allowing 20 dB of isolation; neutralizing lines, allowing 15 dB of isolation; dielectric enclosures, allowing 15 dB of isolation; "metamaterials" (materials engineered at the microscopic level in order to obtain good electromagnetic properties), allowing 25 dB of isolation.

Figure 6:
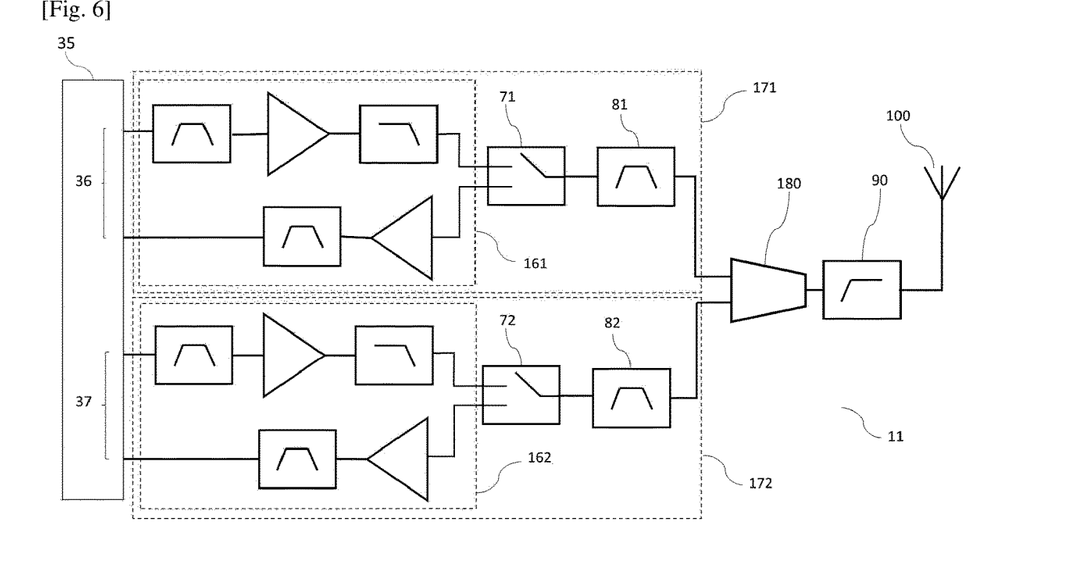
FIG. 6 shows the LPWAN RF chain according to a second embodiment of the invention adapted to several LPWAN networks.
Figure 7:
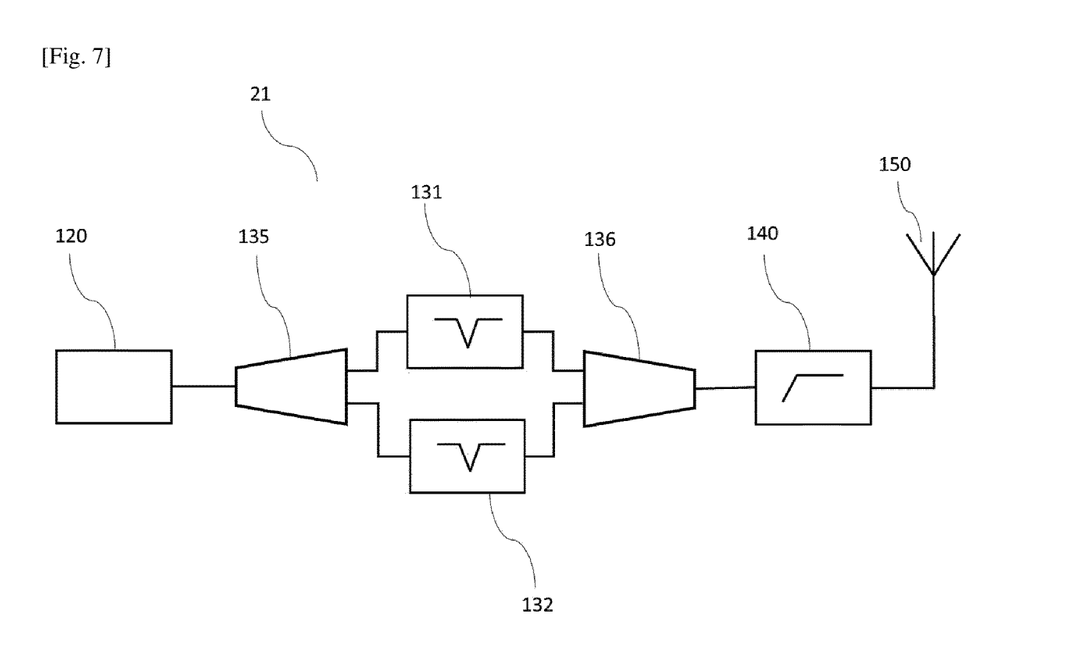
FIG. 7 shows the cellular RF chain according to a second embodiment of the invention adapted to several LPWAN networks.

FIGS. 6 and 7 show a second embodiment of the gateway 2, where the latter is able to connect to a sub-group of LPWAN networks selected from amongst a whole group. The case may be envisioned of a use for example by a store manager who would like to group all the meters of his store (electric meter, gas meter, etc.) into one and the same network, and the vending machines on a second network.

Each of the networks of the group is characterized by a respective frequency band. [FIG. 6] shows the LPWAN RF chain 11. It has been shown in a variant adapted to a group of two LPWAN networks but may easily be generalized to an indefinite number of LPWAN networks. The transponder 35 comprises a respective transmitter-receiver pair 36, 37 for each LPWAN network. Each of the filtering blocks 171, 172 is associated with a respective LPWAN network and comprises a respective amplification block 161, 162, where necessary a respective channel selector 71, 72, a respective bandpass filter 81, 82 passing the frequencies within the frequency band of the respective LPWAN network and attenuating the power of the frequencies outside of the frequency band of this network, A multiplexer 180 connects the selected filtering block or blocks 171 or 172 to the part of the LPWAN RF chain 11 common to all the filtering blocks and to the antenna 100.

Figure 3:
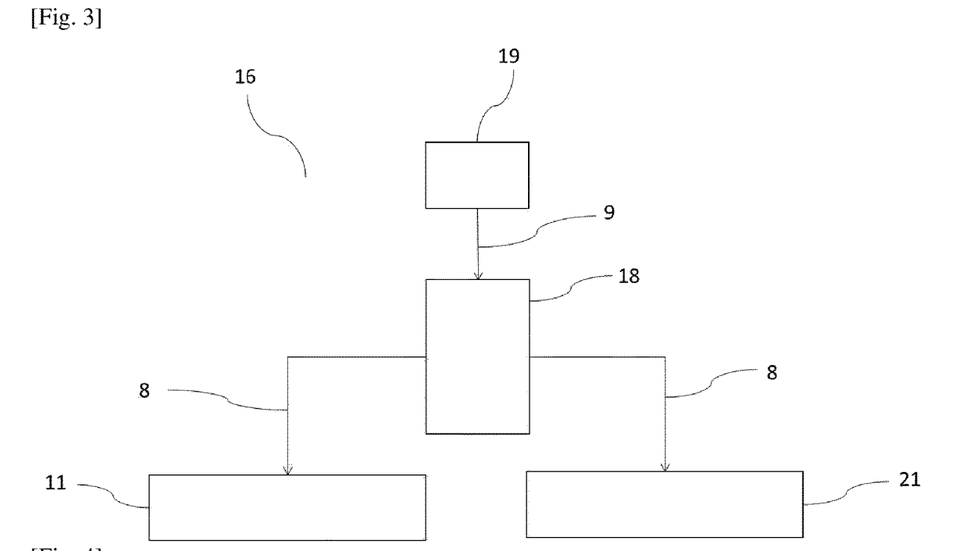
FIG. 3 shows the gateway control unit.

The selection of the sub-group of LPWAN networks is made by means of the control block 16 shown in [FIG. 3]. The user has access to the control block 16 via a human-machine interface 19. The human-machine interface 19 displays to him/her the group of available LPWAN networks and the user selects a certain number of them depending on the network or networks that he/she wishes to create. The human-machine interface 19 transmits the list of the selected networks to the control unit 18. The control unit 18 then programs the LPWAN RF chain 11 (and the cellular RF chain 21 as described hereinbelow) by the command 8. In the LPWAN RF chain 11, it programs the multiplexer 180, as already described, so that it connects the sub-group of the selected networks to the antenna 100 (via other elements).

[FIG. 7] the cellular RF chain 21 in one embodiment of the gateway 2 where it is able to connect to a sub-group of LPWAN networks chosen from amongst a whole group. Just like the LPWAN RF chain 11, the cellular RF chain 21 has been shown in one variant adapted to two LPWAN networks but may easily be generalized to an indefinite number of LPWAN networks. It comprises several rejection filters 131, 132 configured in parallel and respectively associated with each of the LPWAN networks to which the gateway 2 is able to connecter. The rejection filter associated with a respective LPWAN network attenuates the power of the frequencies emitted by the cellular RF chain 21 (the frequencies in the band of the uplink of the cellular network) which are situated within the frequency band of this LPWAN network. On either side of the rejection filters 131, 132, there are multiplexers 135, 136 which allow the rejection filter or filters to be selected, 131 for example, corresponding to the sub-group of selected LPWAN networks. The adjustment of the multiplexers 135, 136 is therefore linked to that of the multiplexer 180, and when the user chooses a LPWAN network, all the elements, the filtering block 171 of the LPWAN RF chain 11, assuming that it is that which has been chosen, the multiplexer 180 of the LPWAN RF chain 11, the multiplexers 135, 136 of the cellular RF chain 21, the rejection filter 131 of the cellular RF chain 21, assuming that it is that which corresponds to the filtering block 171 of The LPWAN RF chain, are conveniently adjusted at the same time.

In fact, the control unit 18 sends to the cellular RF chain 21, for the adjustments that are specific to it, a command 8 similar to that sent to the LPWAN RF chain. If, subsequently, the user decides to reprogram the LPWAN RF chain, a new command 8 will accordingly be sent to the two RF chains 11, 21.

Although the invention has been described in conjunction with several particular embodiments, it goes without saying that it is in no way limited to these and that it comprises all the technical equivalents of the means described, together with their combinations if the latter fall within the framework of the invention.

The usage of the verb "comprise" or "include" and of its conjugated forms does not exclude the presence of elements or of steps other than those stated in a claim in the claims, any reference sign between parentheses should not be interpreted as a limitation of the claim.

The invention claimed is:

1. A communications gateway (2) for communicatively connecting at least one low-power wide area network (LPWAN) network and at least one cellular network, the gateway comprising:
    a first RF chain (10) for communicating with said at least one LPWAN network, the first RF chain comprising a LPWAN antenna (100), a transponder (30) with a transmitter (31) and a receiver (32) and, installed in series between the transponder and the LPWAN antenna (100):
    at least one filtering block (170), comprising:
    an amplification block (160) comprising an uplink channel and a downlink channel configured in parallel, and
    a part common to the uplink channel and to the downlink channel, the common part comprising a bandpass filter (80) passing the frequencies in a band of frequencies of said at least one LPWAN network, attenuating the power of the frequencies outside of the band of said LPWAN network, the part positioned going toward the LPWAN antenna (100) and a first high-pass filter (90); and
    a second RF chain (20) toward said cellular network, the second RF chain for establishing an uplink and downlink connection with the cellular network, a frequency band of the downlink and a frequency band of the uplink of the cellular network being outside of the band of said LPWAN network, the second RF chain comprising a cellular antenna (150), a modem (120) and, installed in series between the modem and the antenna:
    at least one rejection filter (130) attenuating the power of the frequencies within the frequency band of said at least one LPWAN network and passing the frequencies within the frequency band of the downlink and the frequency band of the uplink of the cellular network.

2. The gateway of claim 1, wherein the second RF chain (20) comprises a single rejection filter (130) and a second high-pass filter (140) between the rejection filter (130) and the cellular antenna (150).

3. The gateway of claim 1, wherein the second RF chain (20) comprises a single rejection filter (130) connected directly to the cellular antenna (150).

4. The gateway of claim 1, for connecting, on the one hand, a sub-group of LPWAN networks selected from amongst a group of LPWAN networks operating in respective frequency bands and, on the other hand, a cellular network, wherein:
    the transponder (35) of the first RF chain (11) comprises a respective transmitter-receiver pair (36, 37) for each of the members of the group of LPWAN networks;
    the first RF chain comprises a plurality of filtering blocks, each of the filtering blocks (171, 172) being associated with a respective member of the group of LPWAN networks and comprising an amplification block (161, 162), a bandpass filter (81, 82) passing the frequencies within the frequency band of said respective member of the group of LPWAN networks and attenuating the power of the frequencies outside of the band of said respective member of the group of LPWAN networks;

the first RF chain (21) furthermore comprises a LPWAN network multiplexer (180), arranged between the filtering blocks (171, 172) and the first high-pass filter (90);

the second RF chain comprises several rejection filters (131, 132) configured in parallel and respectively associated with each of the members of the group of LPWAN networks, the rejection filter associated with a respective member of the group of LPWAN networks attenuating the power of the frequencies in the band of said respective member of the group of LPWAN networks and passing the frequencies within the frequency band of the downlink and the frequency band of the uplink of the cellular network; and the second RF chain furthermore comprises a first (135) and a second (136) rejection filter multiplexer for selectively connecting the rejection filters associated with a sub-group of selected LPWAN networks, which first (135) and second (136) rejection filter multiplexers supervise said several rejection filters (131, 132), the second rejection filter multiplexer (136) being on the side of the cellular antenna (150).

5. The gateway of claim 4, furthermore comprising a control block (16), the control block (16) comprising:
 a human-machine interface (19) which allows the sub-group of LPWAN networks to be selected; and
 a control unit (18) configured for programming the multiplexer (180) of the first RF chain (11) so that the multiplexer (180) connects the filtering blocks (171, 172) associated with the respective members of the sub-group of selected LPWAN networks, and for programming the first and second multiplexers (135, 136) of the second RF chain so that they connect the rejection filters (131, 132) associated with the respective members of the sub-group of selected LPWAN networks.

6. The gateway of claim 4, wherein the second RF chain (21) comprises a second high-pass filter (140) between the second rejection filter multiplexer (136) and the cellular antenna (150).

7. The gateway of claim 4, wherein the second rejection filter multiplexer (136) of the second RF chain is connected directly to the cellular antenna.

8. The gateway of claim 1, wherein said or each filtering block (170, 171, 172) of the first RF chain furthermore comprises a channel selector (70) arranged between the amplification block (160, 161, 162) and the bandpass filter (80, 81, 82) and configured so as to obtain a half-duplex operation in the frequency band of the LPWAN network or of the respective member of the associated group of LPWAN networks.

9. The gateway of claim 1, wherein said bandpass filter (80, 81, 82) of said or of each filtering block is configured for attenuating by at least 20 dB the power of the frequencies outside of the band of the LPWAN network or of the respective member of the associated group of LPWAN networks.

10. The gateway of claim 1, wherein said or each rejection filter (131, 132) of the second RF chain is configured for attenuating by at least 20 dB the power of the frequencies within the frequency band of the LPWAN network or of the respective member of the associated group of LPWAN networks.

11. The gateway of claim 1, comprising an electronic board on which the first RF chain (10, 11) and the second RF chain (20, 21) are installed and whose size does not exceed 12 cm in the three dimensions.

12. The gateway of claim 1, wherein said first (10, 11) and second (20, 21) RF chains are adapted to a difference of at most 8 MHz between any one of the frequency bands of the cellular network and the frequency band of the or each member of the group of LPWAN networks.

13. The gateway of claim 1, wherein the uplink or downlink signals on the first RF chain conform to the standard EN 300 220.

14. The gateway of claim 1, wherein the bandpass filter or filters are chosen from within the group of surface acoustic wave filters, of bulk acoustic wave filters and of ceramic filters.

15. The gateway of claim 1, wherein the rejection filter or filters are chosen from within the group of surface acoustic wave filters, of bulk acoustic wave filters and of ceramic filters.

16. The gateway of claim 1, wherein the isolation of the first and second RF chains is completed by one or more techniques for isolation of antennas chosen from within the group of the decoupling of antennas, of the addition of antenna interference elements, of defected ground structures, of neutralizing lines, of dielectric enclosures, of metamaterials.

* * * * *